United States Patent [19]

Santarelli et al.

[11] 3,756,548

[45] Sept. 4, 1973

[54] TRASH BAG CART WITH ADJUSTABLE BAG HOLDER

[76] Inventors: Salvatore P. Santarelli, 20910 Eastlawn, Apt. 65, St. Clair Shores, Mich. 48080; John Colombini, deceased, late of Birmingham, Mich.; by Peter Sergolia, executor, 15010 Seymour, Detroit, Mich. 48205

[22] Filed: Oct. 21, 1971

[21] Appl. No.: 191,527

[52] U.S. Cl. ............ 248/98, 248/99, 248/129, 280/47.31
[51] Int. Cl. ............................................ B65b 67/12
[58] Field of Search .................. 248/94, 95, 97, 98, 248/99, 100, 101, 128, 129, 146, 149, 148, 310, DIG. 7; 280/47.26, 79.2; 211/83, 71

[56] References Cited
UNITED STATES PATENTS

| | | | |
|---|---|---|---|
| 292,648 | 1/1884 | Hayman | 248/97 |
| 2,372,372 | 3/1945 | Faure | 280/47.26 |
| 1,739,588 | 12/1929 | Greene | 248/DIG. 7 |

*Primary Examiner*—Roy D. Frazier
*Assistant Examiner*—Rodney H. Bonck
*Attorney*—Robert G. Mentag

[57] ABSTRACT

A trash bag cart having a circular pan with side walls. The pan is rollably supported and is provided with a pair of ground engaging legs and a handle for pushing the cart. A plurality of rods is adjustably mounted on the walls of the pan so that they may be reversed in their positions for holding the upper ends of various size plastic trash bags, and the like, in an open position for inserting trash into the bag. The bottom of the trash bag is supported by the bottom wall of the pan.

1 Claim, 4 Drawing Figures

PATENTED SEP 4 1873 3,756,548
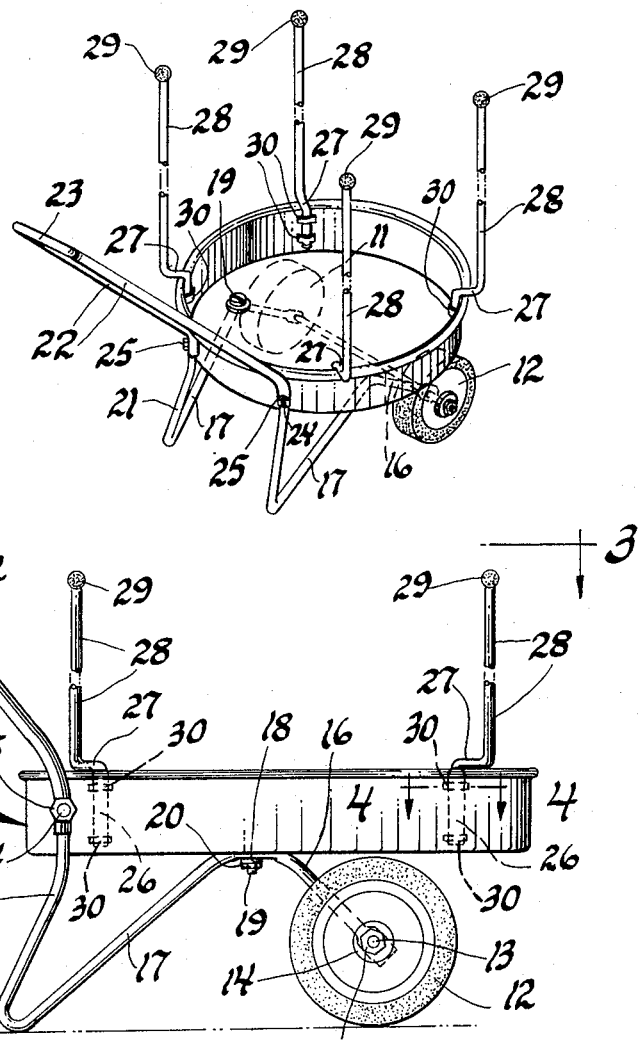
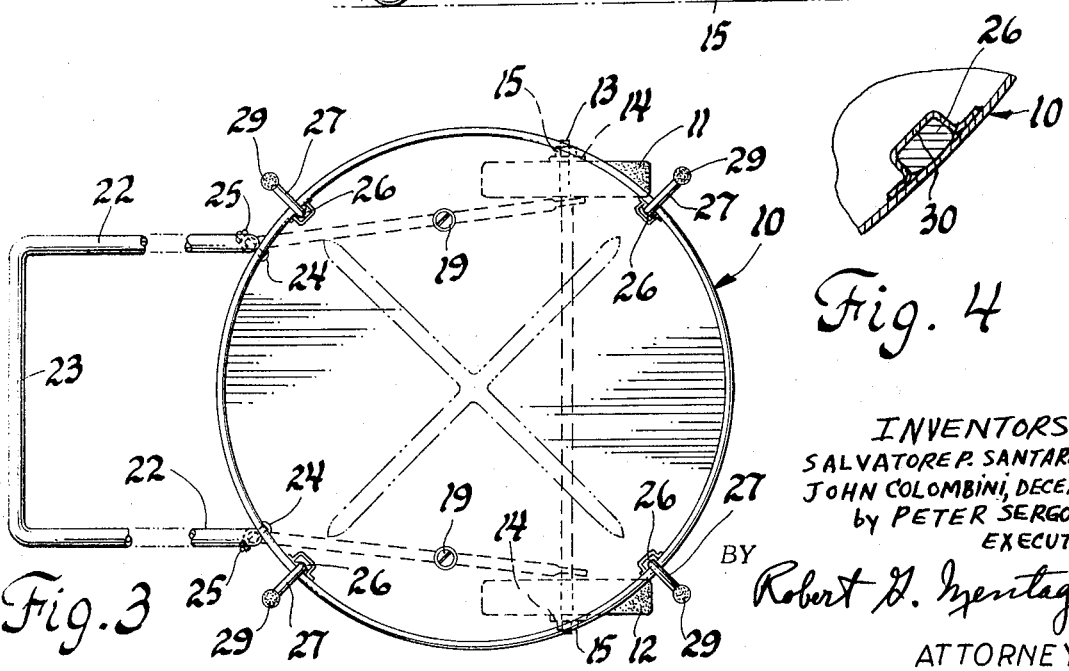
Fig. 1
Fig. 2
Fig. 3
Fig. 4
INVENTORS
SALVATORE P. SANTARELLI
JOHN COLOMBINI, DECEASED
by PETER SERGOLIA
EXECUTOR
BY Robert G. Mentag
ATTORNEY

TRASH BAG CART WITH ADJUSTABLE BAG HOLDER

BACKGROUND OF THE INVENTION

Heretofore various types of sack carts have been provided as, for example, the sack cart shown in U.S. Pat. No. 3,041,026. U.S. Pat. No. 292,648 also shows a stationary bag holder provided with movable rods for supporting the upper ends of a bag.

SUMMARY OF THE INVENTION

This invention relates generally to a new and useful improvement in trash bag carts and, more particularly, to a new and improved trash bag cart provided with a plurality of adjustable trash bag holders for supporting a trash bag in an open position for filling purposes.

The trash bag cart of the prevent invention is adapted to hold a conventional plastic trash bag or the like in an open position for filling purposes and also for transporting a filled trash bag to a desired location for pick-up purposes and the like.

It is an important object of the present invention to provide a novel and improved trash bag cart which is simple and compact in construction, economical to manufacture and efficient in use.

It is another object of the present invention to provide a novel and improved trash bag cart which includes a supporting platform for supporting the bottom of a trash bag, means for rollably supporting said platform, handle means operatively connected to said platform, ground supporting legs operatively connected to said platform, a plurality of adjustable rods having upper ends for supporting the upper ends of a trash bag in an open position, and means carried by said platform for releasably supporting said rods, whereby said rods may be adjusted to various positions for holding various size diameter bags in an open condition for the reception of trash. The rods may be adjusted in a one-by-one manner to provide means for holding different size diameter bags, or they may be adjusted as a group to provide either the smallest or largest diameter holding position. The diameter size holding positions provided by merely adjusting one or more of the rods provides diameter bag positions for sizes in between the smallest and largest diameter bag positions.

Other objects, features and advantages of this invention will be apparent from the following detailed description, appended claims, and the accompanying drawing.

BRIEF DESCRIPTION OF THE DRAWING

FIG. 1 is a broken, perspective view of a trash bag cart provided with adjustable trash bag holders made in accordance with the principles of the present invention.

FIG. 2 is an enlarged, broken, side elevational view of the structure illustrated in FIG. 1.

FIG. 3 is a broken, top plan view of the structure illustrated in FIG. 2, taken along the line 3—3 thereof, and looking in the direction of the arrows.

FIG. 4 is a fragmentary, enlarged, horizontal section view of the structure illustrated in FIG. 2, taken along the line 4—4 thereof, and looking in the direction of the arrows.

DESCRIPTION OF THE PREFERRED EMBODIMENT

Referring now to the drawing and in particular to FIGS. 2 and 3, the numeral 10 generally designates a circular cart pan which is made from any suitable material as, for example, metal, plastic or the like. As best seen in FIGS. 2 and 3, the circular pan 10 is rollably supported on a pair of suitable cart wheels 11 and 12 which are operatively mounted on an axle or shaft 13. The wheels 11 and 12 are operatively secured on their respective ends of said axle by a pair of washers 14 and lock nuts 15. Each end of the axle 13 is operatively carried on the lower end of a forwardly and downwardly sloping axle support arm 16. The upper end of each of the axle support arms 16 is integrally connected to a rearwardly and downwardly extended leg portion 17. Each of the parts 16 and its respective part 17 are integrally joined by a flattened connector member which is attached to the bottom of the cart pan 10 by any suitable means, as by a screw 19, a lock washer 18 and a nut 20.

As illustrated in FIG. 2, each of the leg portions 17 is integrally connected at its rear lower end by a U-shaped member with the lower end of an upwardly extended leg portion 21. Each leg portion 21 has slidably mounted over its upper end an upwardly and rearwardly extended handle arm 22. As shown in FIG. 3, the upper ends of each of the handle arms 22 are integrally formed with a cart handle 23. It will be seen that the aforementioned parts 16, 17, 21, 22 and 23 may be formed from any suitable materials as, for example, plated metal tubing or the like. As shown in FIGS. 2 and 3, each of the upper ends of the leg portions 21 is secured to the rear end of the pan 10 at the junction point with the lower end of its adjacent handle arm 22, by a suitable bolt 24 and lock nut 25.

As best seen in FIGS. 1 and 3, the cart pan 10 supports four adjustable trash bag supporting holders or rods 28 which are each provided on the upper end thereof with a fixedly mounted ball tip 29. As illustrated in FIGS. 1 and 4, the lower ends 26 of the rods 28 are axially offset, and they are substantially rectangular in cross section. Each of the offset lower rod ends 26 are integrally connected from their upper ends to the lower ends of the rods 28 by a horizontal connector rod portion 27. The offset lower ends 26 of the rods 28 are each slidably mounted in a pair of vertically spaced supporting brackets or straps 30 which are secured to the inner surface of the cart pan 10 by any suitable means, as by welding.

It will be seen that the rods 28 can be slidably mounted and slidably removed from their supporting straps 30 and that they may be disposed in an outer position, as shown in FIGS. 1 and 3. However, it will be understood that the rods 28 may also be lifted upwardly and then turned 180° and repositioned in their supporting straps 30 so as to move the rod 28 inwardly. It will be seen that by reversing the position of the rods 28, one at a time, the supporting diameter provided by the ball ends 29 may be decreased in a step-by-step fashion to provide different diameter supporting means for trash bags of different diameters. The straps 30 form sockets for the rod ends 26. The straps 30 and the wall of the pan 10 form means for releasably supporting said rods.

It will be understood that the straps or brackets 30 are so formed relative to each of the rectangular rod lower ends 26 that a friction fit is provided when the rod 28 is in the reversed or inward position to hold the rod 28 in place vertically. When the rods 28 are in the positions shown in FIGS. 1 through 3, the rod horizontal portions 27 may rest on the upper edge of the wall of the cart pan 10.

It will be seen that the cart pan 10 forms a supporting platform for the bottom or lower end of the trash can bag as, for example, a conventional plastic trash bag. The upper end of the bag is folded over the four ball tips 29 so that the bag is held in an open position. The adjustable bag holders or rods 28 are adapted to hold various diameter bags as, for example, one embodiment of the invention held bags of different sizes of from a 16 inch bag up to a 22 inch bag. With the rods 28 removed, the cart pan 10 and its rollable supporting structure can be used as a handy two-wheel cart for hauling garbage cans, boxes and so forth. In one embodiment, the length of the rods 28 was approximately 21 ½ inches, extended above the upper edge of the cart pan 10. However, it will be understood that they may be made to any desirable length.

While it will be apparent that the preferred embodiment of the invention herein disclosed is well calculated to fulfill the objects above stated, it will be appreciated that the invention is susceptible to modification, variation and change.

What is claimed is:

1. A trash bag cart comprising:

a. a supporting platform for supporting the bottom of a trash bag;
 b. means for rollably supporting said platform;
 c. handle means operatively connected with said platform;
 d. ground supporting legs operatively connected to said platform;
 e. a plurality of adjustable rods having upper ends for supporting the upper end of a trash bag in an open position;
 f. means carried by said platform for releasably supporting said rods, whereby said rods may be adjusted to various positions for holding various size diameter bags in an open condition for the reception of trash;
 g. each of said adjustable rods being formed with an offset lower end, whereby said rods may be reversed in their positions to move the upper ends of the rods to said various positions;
 h. said means on said platform for releasably supporting said rods including a wall mounted on said platform, and socket means carried on said wall for each of said rods for the reception of the offset lower end of one of said rods; and,
 i. the lower offset end of each of said rods being shaped in accordance with the shape of said sockets so as to retain said rods in an adjusted position in said sockets against rotational movement of said rods.

* * * * *